Sept. 8, 1925.　　　　　　　　　　　　　　　　　1,552,714
F. L. LINZY
ROTARY SNOWPLOW
Filed April 14, 1925　　　2 Sheets-Sheet 1

Inventor
Floyd L. Linzy
By Lister L. Sargent
Attorney

Sept. 8, 1925.  1,552,714
F. L. LINZY
ROTARY SNOWPLOW
Filed April 14, 1925  2 Sheets-Sheet 2
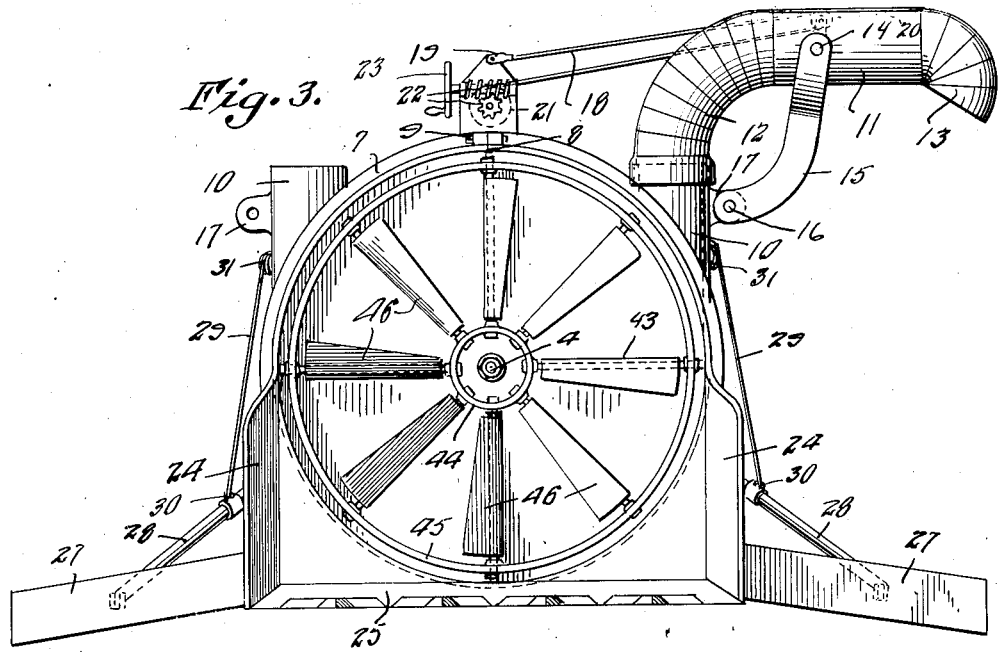

Patented Sept. 8, 1925.

1,552,714

UNITED STATES PATENT OFFICE.

FLOYD L. LINZY, OF BATAVIA, NEW YORK.

ROTARY SNOWPLOW.

Application filed April 14, 1925. Serial No. 23,017.

*To all whom it may concern:*

Be it known that I, FLOYD L. LINZY, a citizen of the United States, residing at Batavia, in the county of Genesee and State of New York, have invented a new and useful Rotary Snowplow, of which the following is a specification.

The object of my invention is to provide an improved type of rotary snow plow. I attain the objects of my invention by the apparatus illustrated in the accompanying drawings, in which—

Fig. 3 is a front elevation, with parts of the apparatus omitted;

Fig. 4 is a detail sectional view through the rotary plow;

Fig. 5 is a vertical section on a plane immediately rearward of shaft 39;

Fig. 6 is a perspective view of the blade 46; and

Fig. 7 is a detail perspective view of members 6 and 7 and 8 and 9.

Like numerals indicate like parts in each of the several views.

Figure 1:
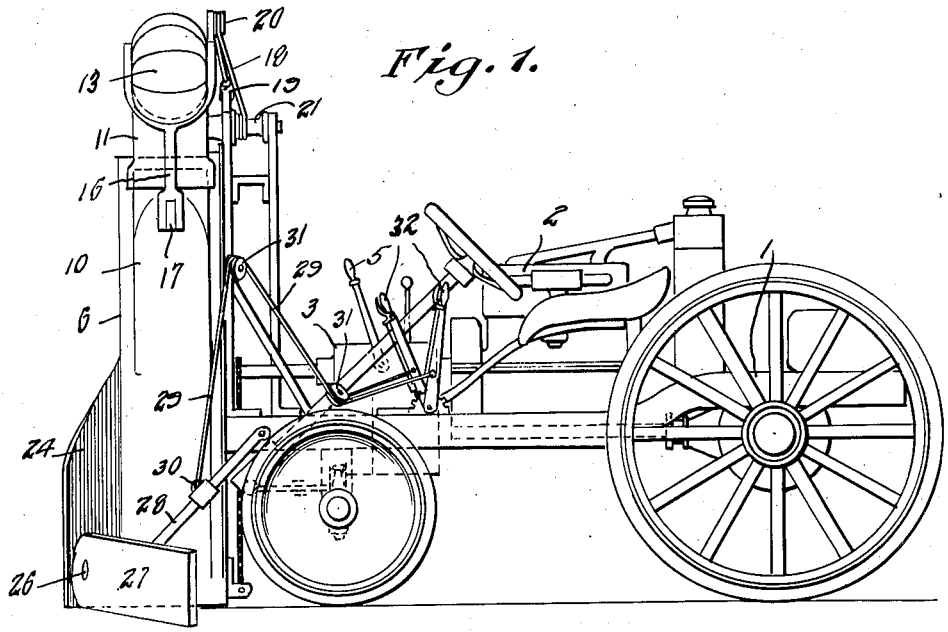
Figure 1 is a side elevation of my invention.
Figure 2:
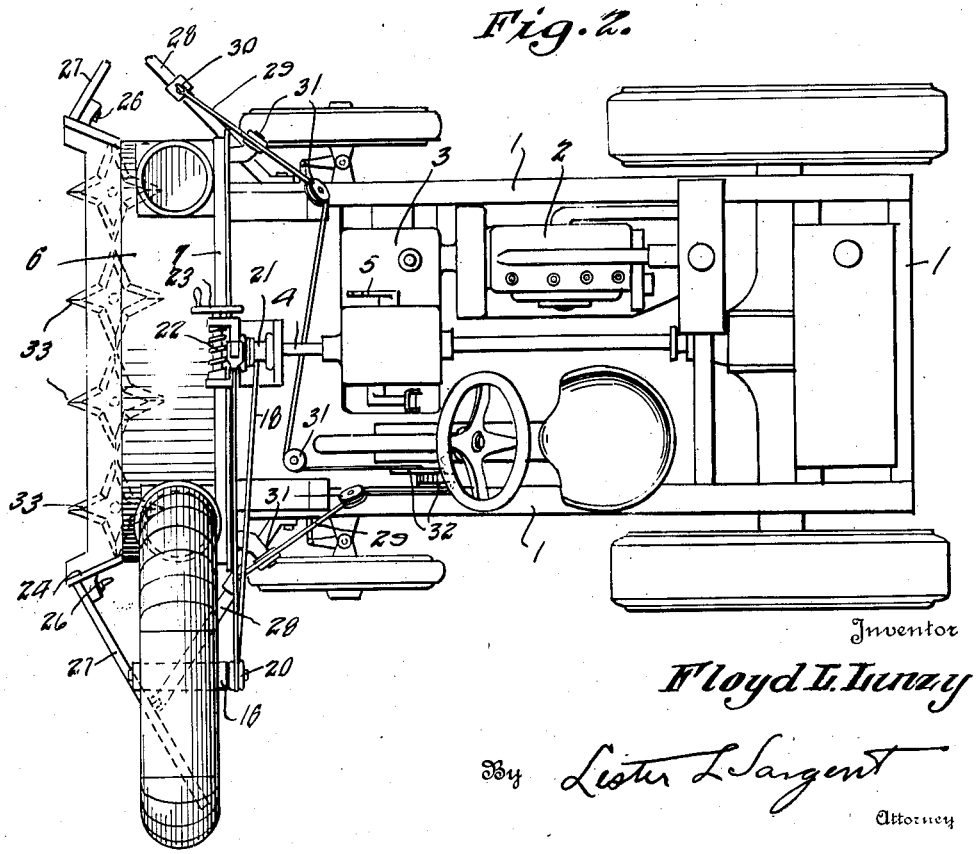
Fig. 2 is a top plan view of same.

Referring to the accompanying drawings, I provide a suitable chassis frame 1 carrying an engine 2, transmission 3 driving shaft 4 and reverse control 5. I provide at the front of the chassis a housing 6 carrying peripherally mounted member 7. The housing 6 and member 7 are split at 8 and are secured together by the screw or bolt 9. I provide outlet spout 10 opening out of the housing 6 and connected with a flexible elbow 12, which in turn is connected to the delivery pipe 11 which terminates in a hood 13, as shown in Fig. 3. Delivery pipe 11 is supported by the brace or yoke 15 which is attached to pipe 11 by pivot 14 and to a bracket 17 by pivot 16. I provide a cable 18 attached at 19 to a suitable part of the frame or bracket, the cable extending over the roller 20 affixed to pipe 11, the cable then being run back and attached to a windlass 21 which is operated by the worm 22 controlled by hand wheel 23 as shown in Figs. 1 and 2 and 3. I provide vertical shield or guard plates 24 at either side of the rotary snow plow. I also provide adjustably mounted and rearwardly extending scraper blades 27 pivotally attached at 26 to guard plates 24 and adjustably braced by the adjustable brace rods 28. Rods 28 are controlled by a cable 29 attached to collar 30 and which cable extends over pulleys 31 and is controlled by the levers 32, as shown in Figs. 1 and 2. I also provide a bottom scraping blade 25 extending horizontally in advance of the plow between the guard plates 24 as shown in Fig. 3. I also provide star-shaped cutting wheels 33 arranged under and in advance of plate 25. The star-shaped cutting wheel 33 carries a gear 34 which meshes with a gear 35 on a shaft 36 which in turn carries gear 37 meshing with gear 38 on shaft 39. The shaft 36 also carries a sprocket wheel 40 driven by chain 41 which in turn is driven by sprocket 42 on driving shaft 4, as shown in Fig. 4.

Referring to Fig. 3 I provide the rotary snow-plow 43 comprising a series of radial blades 46 mounted on the inner rim 44 and the outer rim 45, as illustrated. Blade 46 has the sides 47 diverging from the cutting edge 48 as shown and has the stub shafts 49 which are mounted in the rims 44 and 45. I provide a fan wheel 50 mounted on the driving shaft 4 and positioned rearward of the snow-plow 43. Fan wheel 50 has the fan blade 51 as shown in Fig. 4, to blow the snow into the discharge spouts 10. The back 52 of the shield or housing 6 prevents the snow escaping rearwardly of the snowplow and rotary fan.

In operation the snow-plow 43 cuts the snow and breaks up the crust, the snow then being taken up by the fan blades 51 which discharge it through the outlet 10, elbow 12, delivery pipe 11 and discharge elbow 13. The rotary cutting blades 33 cut hard snow crust or ice in the path of the machine so that it will be readily gathered by the blades 25. The snow-plow and fan may be driven in either a clockwise or anti-clockwise direction. The blades 27 are adjustable by means of the brace rods 28 and cables 29 controlled through the levers 32. The delivery spouts also are adjustable in the manner heretofore described and as shown in the drawings. It is within the contemplation of my invention to position the outlets 10 at any suitable or desired angle opening out of the casing 6 to which they are connected.

What I claim is:

1. In a rotary snow-plow, the combination of a pair of rotors mounted on a power driven shaft, one of the rotors having spaced blades set at an angle to the rim of the rotor, and the other rotor having the blades disposed in a right-angular position, a shield encasing the rotors, spouts for the discharge of snow on either side of the rotors, vertically adjustable scraper blades arranged at either side of the rotors, extension spouts pivotally mounted on the first-mentioned spouts, and means for adjusting said extension spouts to a desired adjusted position relative to the first-mentioned spouts.

2. In a rotary snow-plow, the combination of a pair of rotors mounted on a power driven shaft, one of the rotors having spaced blades set at an angle to the rim of the rotor, and the other rotor having the blades disposed in a right-angular position, a shield encasing the rotor, spouts for the discharge of snow on either side of the rotors, vertically adjustable scraper blades arranged at either side of the rotors, and manually controlled means for raising and lowering the scraper blades.

3. In a rotary snow-plow, the combination of a pair of rotors mounted on a power driven shaft, one of the rotors having spaced blades set at an angle to the rim of the rotor, and the other rotor having the blades disposed in a right-angular position, a shield encasing the rotors, spouts for the discharge of snow on either side of the rotors, vertically adjustable scraper blades arranged at either side of the rotors, extension spouts pivotally mounted on the first-mentioned spouts, means for adjusting said extension spouts to a desired adjusted position relative to the first-mentioned spouts, and manually controlled means for raising and lowering the scraper blades.

4. In combination with a rotary snow-plow, a plurality of horizontally positioned rotatable cutting wheels, means for rotating said wheels, and a scraper blade immediately under which the said wheels are mounted.

5. In a rotary snow-plow, the combination of a pair of rotors mounted on a power driven shaft, one of the rotors having spaced blades set at an angle to the rim of the rotor, and the other rotor having the blades disposed in a right angular position, a shield encasing the rotors, spouts for the discharge of snow on either side of the rotors, scraper blades arranged at either side of the rotors, a plurality of horizontally positioned cutting wheels, means for rotating said wheels, and a scraper blade immediately under which the said wheels are mounted.

6. In a snow-plow, the combination of a pair of rotors mounted on power driven shafts, one of the rotors having spaced blades set at an angle to the rim of the rotor and the other rotor having the blades disposed at right angles to the rim of the rotor, a shield encasing the rotors, spouts for the discharge of snow at either side of the rotors, means for operating the rotors in either clockwise or anti-clockwise direction, scraper blades mounted at either side of the rotors, and means for vertically adjusting said blades, said blades being disposed in a rearwardly slanting direction.

7. In a snow-plow, the combination of a pair of rotors mounted on power driven shafts, one of the rotors having spaced blades set at an angle to the rim of the rotor and the other rotor having the blades disposed at right angles to the rim of the rotor, a shield encasing the rotors, spouts for the discharge of snow at either side of the rotors, means for operating the rotors in either clockwise or anti-clockwise direction, horizontally disposed rotary cutting wheels positioned forward of and under the rotors, means for rotating said wheels, and a horizontal scraper blade positioned immediately over the rotary cutting wheels.

8. In a snow-plow, the combination of a pair of rotors mounted on power driven shafts, one of the rotors having spaced blades set at an angle to the rim of the rotor and the other rotor having the blades disposed at right angles to the rim of the rotor, a shield encasing the rotors, spouts for the discharge of snow at either side of the rotors, means for operating the rotors in either clockwise or anti-clockwise direction, a horizontal scraper blade under which the cutting elements are mounted, means for operating said cutting elements, and a horizontal scraper blade positioned immediately over said cutting wheels and in advance of the rotors above mentioned.

FLOYD L. LINZY.